J. Watson,

Lathe.

No. 100,473.  Patented Mar. 1, 1870.

WITNESSES,
Wm. A. Steel
Jno. B. Harding

J. Watson
By his attys
Howson & Son

United States Patent Office.

JAMES WATSON, OF PHILADELPHIA, PENNSYLVANIA.

Letters Patent No. 100,473, dated March 1, 1870.

IMPROVEMENT IN LATHES.

The Schedule referred to in these Letters Patent and making part of the same.

I, JAMES WATSON, of Philadelphia, county of Philadelphia, State of Pennsylvania, have invented an Improvement in Lathes, of which the following is a specification.

Nature and Object of the Invention.

My invention relates to an improvement in lathes, having recessed bed-plates, for permitting the use of face-plates, of larger diameter than can be employed in connection with lathes having plain unrecessed beds; and My invention consists of certain guiding-ribs, arranged in the bed-plate of a lathe of this class, and adapted to projections on the plate which supports the slide-rest, all substantially as described hereafter, so that while the lathe possesses all the advantages of a common lathe, as regards the steadiness of the slide-rest, it has all the advantages of a gap-lathe as regards its capacity for turning objects of a large diameter.

Description of the Accompanying Drawing.

Figure 1:
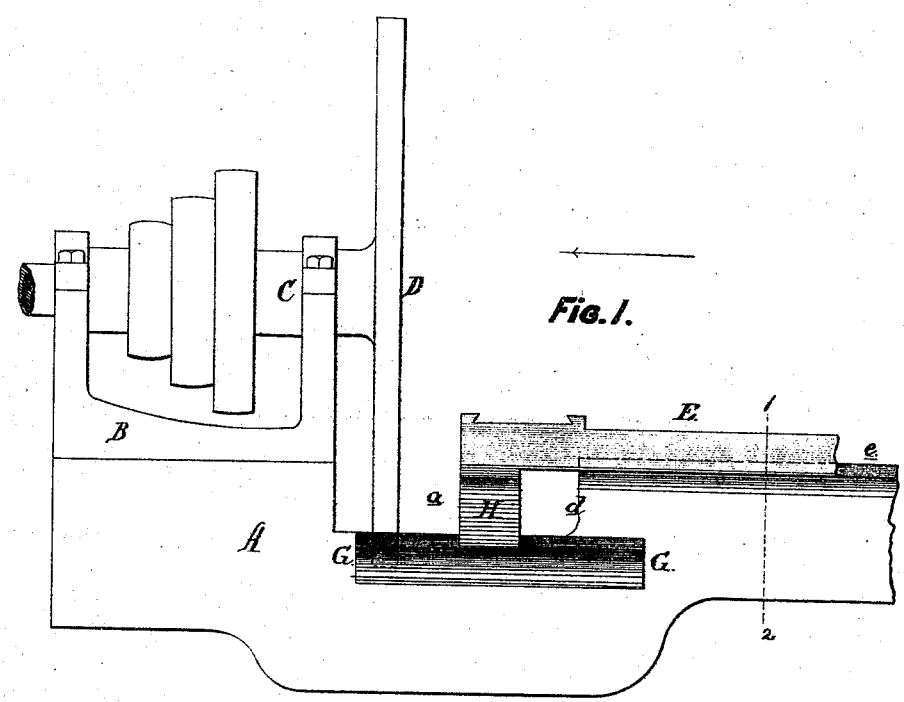
Figure 2:
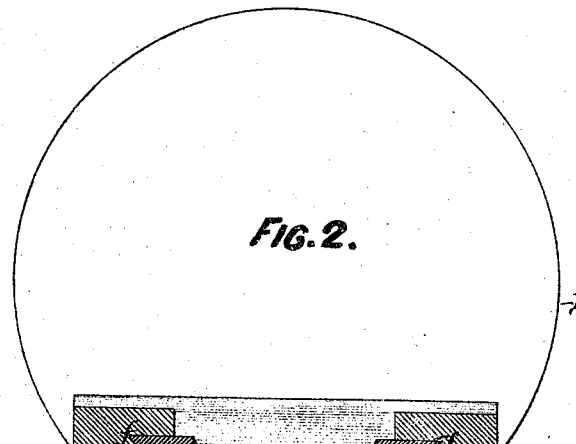

Figure 1 is a side view of sufficient of a lathe to illustrate my invention, and Figure 2, a transverse section on the line 1 2, fig. 1.

General Description.

A is the bed-plate of the lathe;
B, the fixed head-stock;
C, the spindle;
D, the face-plate; and
E, the plate for receiving the slide-rest.

As in other lathes of this class, sometimes termed gap-lathes, a recess, $a$, is formed in the bed-plate for receiving a portion of the face-plate, so that the latter may be of larger diameter than the face-plate of a lathe with a plain unrecessed bed-plate.

When ordinary lathes, however, are used for turning objects of small diameter attached to the face-plate, the plate E, for receiving the slide-rest, must necessarily overhang the end $d$ of the recess $a$ of the bed-plate, and hence there will be a want of sufficient steadiness in the slide-rest.

To obviate this objection it has been customary to fill the gap or recess of the lathe with a metal block, on which are guides, forming continuations of the guides of the bed-plate, which block has to be removed when objects of large diameter are to be turned, and again replaced when the slide-rest is to be adjusted close up to the face-plate.

Lathes have also been constructed with movable shears in order to overcome this difficulty.

In my invention no tedious adjustment or removing and replacing of parts is required, the difficulty being overcome in the following manner:

The plate E is, as usual, adapted to the V-shaped guiding-ribs $f$ of the bed-plate, so that it can be moved along the latter to any desired position, but in addition to these guides there are two supplementary ribs G G, one on each side of the bed-plate, and adjacent to the recess $a$, these ribs being adapted to projections H, on the under side of the plate E, and nearest the face-plate D; hence the said plate E and its slide-rest are as steadily supported as the slide rest of an ordinary lathe, with a plain unrecessed bed-plate, at the same time the projections H present no obstructions to the sliding of the plate E to any desired position toward the rear head-stock of the lathe.

It will be seen without further description, that while my improved lathe possesses all the advantages of a common lathe, as regards the steadiness of the slide-rest, without requiring any adjustment, or removing, or replacing of parts, it has all the advantages of a gap-lathe as regards its capacity for turning objects of large diameter.

Claim.

The lathe-bed, with its recess $a$, and guides $e$ and G, arranged in respect to the face-plate, as described, in combination with a sliding plate, E, having bearings adapted to both guides, substantially as specified.

In testimony whereof, I have signed my name to this specification in the presence of two subscribing witnesses.

JAMES WATSON.

Witnesses:
WM. A. STEEL,
HARRY SMITH.